Patented Sept. 24, 1946

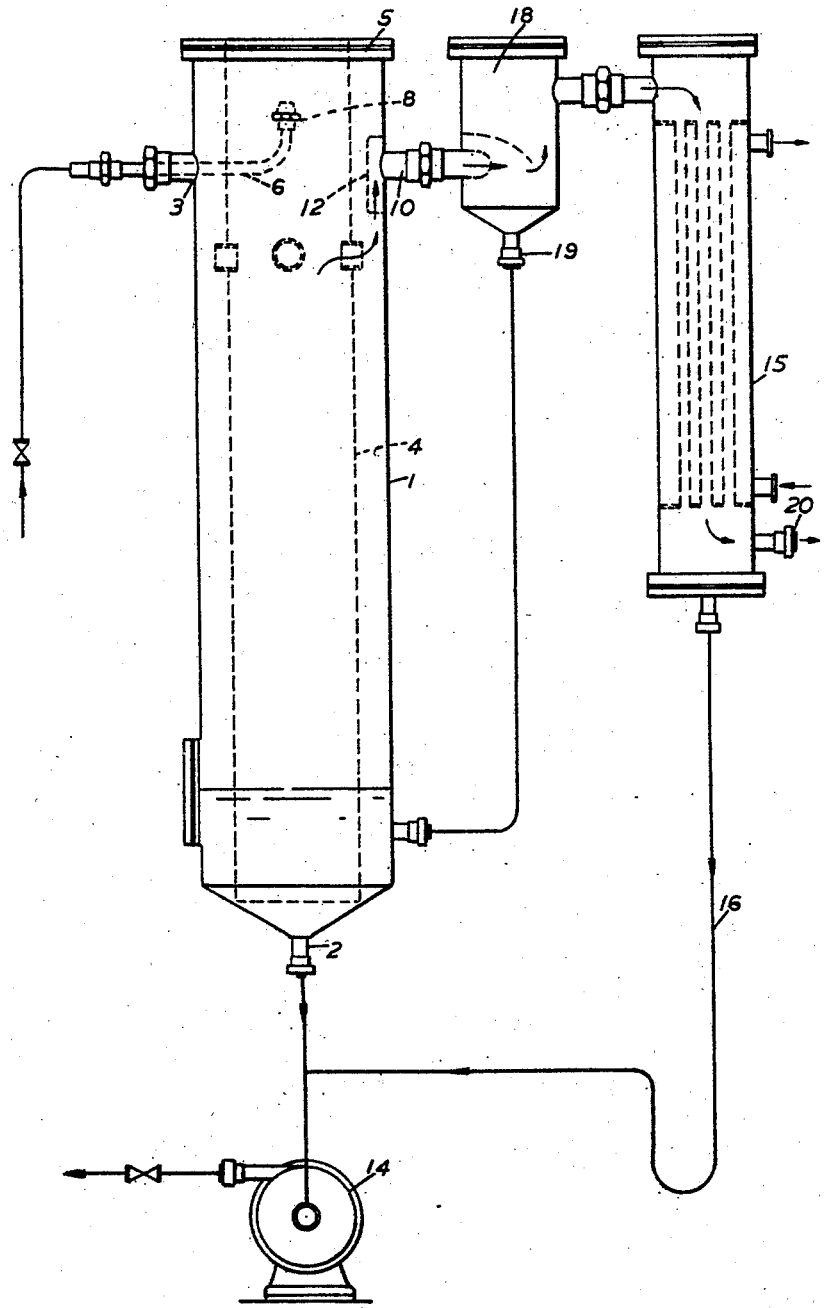

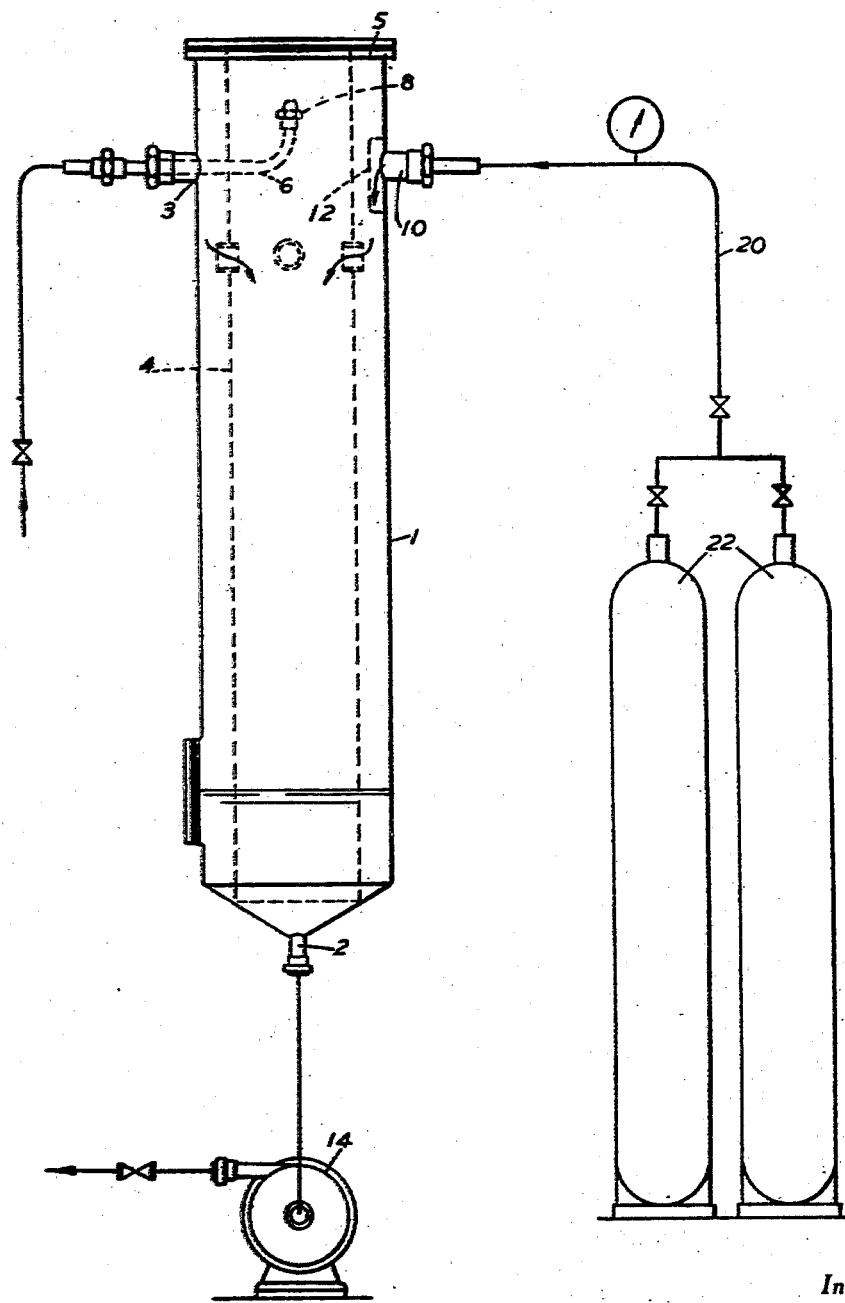

2,408,021

UNITED STATES PATENT OFFICE 2,408,021

TREATMENT OF LIQUIDS

Ronald Arthur Hill, Wandsworth, London, England, assignor to The Aluminium Plant & Vessel Company Limited, London, England, a British company Application February 16, 1945, Serial No. 578,173
In Great Britain January 17, 1944

3 Claims. (Cl. 261—112)

This invention relates to the treatment of liquids and has particular, although not exclusive, reference to the treatment of such liquids as fruit juices and the like, the chief object of the invention being to provide an improved method of and means for subjecting such liquids to the influence of air or gas as in aeration or gas saturation systems or to treatments for the purpose of releasing contained air or gas therefrom.

According to one feature of the invention there is provided a means for carrying out such treatments comprising a treating vessel having arranged therein a vertically disposed tubular member to which the liquid under treatment is supplied by an upwardly-directed, liquid-inlet conduit or nozzle arranged in position within the upper end of the said tubular member, the arrangement being such that the wall of the latter is formed with a series of perforations across which the liquid is spread, stretched, or caused to flow in the form of a thin film so that it is continuously agitated as it passes downwardly along such wall from the top to the bottom of said tubular member.

Such a construction may be used for the carrying out of de-aerating and like operations or for treatments in which a liquid is required to be subjected to the influence of air or gas as in aerating or gas-saturating systems.

In carrying out the invention, the jet of liquid emerging from the upwardly-directed conduit or nozzle is preferably directed against a flat plate, e. g. a polished flat plate composed of glass or other suitable material, so as to spread the same and cause the liquid to pass outwardly to the wall of the said tubular member. In some instances, the arrangement may be such that the liquid film is spread over and caused to flow down the surfaces of the perforated tubular member only but, in many instances, it is preferable to utilise both surfaces of the perforated member and the surface of the inner wall of the surrounding treating vessel for the purpose in view. Thus, for example, the upper end of the perforated member may be formed with a series of serrations or the like permitting some of the spreading liquid to pass on across the flat plate to the inner surface of the treating vessel so that use is made of this relatively large area for furnishing a third thin film of the liquid under treatment.

It will be appreciated that in instances in which a de-aerating or like operation is to be carried out, a sub-atmospheric pressure is maintained in the treating vessel and the latter is equipped with means for removing therefrom the air and vapours released. On the other hand, where an aerating or gas-saturating treatment is to be carried out, the treating vessel is equipped with means for supplying air or gas thereto under pressure and the degree of saturation or aeration obtained will be dependent to some extent upon the pressure prevailing in such vessel.

In order that the said invention may be clearly understood and readily carried into effect the same will now be more fully described with reference to the accompanying drawings in which:

Fig. 1 shows diagrammatically one mode of carrying out the invention as applied to a liquid de-aerating or degassing system; and Fig. 2 shows diagrammatically another mode of carrying out the invention as applied to a liquid aerating or gas-saturation system.

The arrangement shown in Fig. 1 of the accompanying drawings comprises a de-aerating or degassing vessel 1 composed of glass, stainless steel or other suitable material and having its axis disposed vertically or substantially so, the said vessel being provided at its lower end with an outlet 2 for the treatment or de-aerating liquid and near its upper end with a side wall opening 3 adapted to serve as an inlet for preheated liquid, fruit juice or the like. The outlet 2 may be connected with the suction side of a pump 14 and within the treating vessel and spaced from the inner wall thereof there is arranged a tubular member 4 the wall of which is formed over substantially the whole of its height with a series of small perforations. The upper end of the treating vessel is closed by or provided with a flat plate 5 which is preferably polished and may be composed of glass or other suitable material and the arrangement is such that the upper end of the tubular member 4 abuts against such flat plate. The side wall opening 3 is equipped with a liquid inlet conduit 6 which, it will be seen, extends to the space within the tubular member 4 and there terminates in an upwardly-directed nozzle 8 adapted to project the incoming liquid against the flat plate so that the liquid becomes spread and is caused to pass outwardly to the walls of the tubular member 4 down which it flows in the form of thin films which are spread or stretched across the said perforations. In many instances, it is preferable to utilise both surfaces of the perforated tubular member 4 and the inner wall of the surrounding treating vessel 1 for the spreading of the liquid in film form and for this purpose, the upper end of the perforated member 4 may be formed with a series of cut-away portions, serrations or the like permitting some of the spreading liquid to pass on across the flat plate to the inner surface of the treating vessel so as to form a third film thereon.

The fruit juice or other liquid introduced into the treating vessel is preferably pre-heated to a temperature which is slightly in excess of its boiling point under normal pressure conditions and, under operating conditions, a sub-atmospheric pressure is maintained in the said vessel so that the liquid boils on entry.

At its upper end the treating vessel is provided with an outlet 10 for the released air and vapours, which outlet is connected as hereinafter described, with a suitable source of vacuum, e. g. a vacuum pump. As the liquid is preheated prior to admission to the vessel 1, the pump need not be of the high vacuum type. For example, in many instances, it is sufficient to employ a pump capable of providing 28 inches vacuum on a 30 inch barometer. The said outlet is preferably suitably shielded as, for example, by a hood 12.

Interposed between the de-aerating vessel and the vacuum source is a condenser 15 for condensing the vapours and volatile esters, particularly those which are responsible for the aroma and taste of the juice being treated and, in the preferred mode of carrying out the invention, provision is made, e. g. by a conduit 16, for returning such condensed esters to the liquid. In this connection, it is found that the distillate from the condenser, after being cooled therein, should be returned to a point as close to the suction connection of the pump 14 as possible, in order to prevent the condensed esters flashing off again within the de-aerator. The condenser is provided with an outlet 20 connected with the said source of vacuum. If desired, a foam trap 18 may be interposed as shown between the vapour outlet 10 and the inlet to the condenser 15 and such trap may be provided with a bottom outlet 19 connected with the lower part of the treating vessel so that any liquid collected may be returned to the main body of the liquid under treatment.

In Fig. 2 of the accompanying drawings there is shown diagrammatically an arrangement suitable for carrying the invention into effect as applied to a liquid aerating or gas-saturating system. The liquid treating vessel 1 and its contained perforated tubular member are similar to those shown in and described with reference to Fig. 1, the liquid to be aerated or saturated with gas being supplied thereto via the inlet 3 and the nozzle 8 and the treated liquid being withdrawn through the outlet 2. In this instance, however, the side wall opening 10 provided in the upper part of the treating vessel constitutes an inlet for the gas or air with which the liquid is to be treated. For example, the opening may, as shown, be coupled by a pipe line 20 with a source of gas supply such as the cylinders 22 which contain gas under pressure. Thus, in this instance, the treating vessel is equipped with means for supplying air or gas thereto under pressure and, as will be appreciated, the degree of saturation or aeration obtained will be dependent to some extent upon the pressure supplied or prevailing in such vessel.

In either of the arrangements described vent holes may be provided at convenient points in the wall of the perforated member of such a size that no continuous liquid film can form across them, in order that the pressures within and without the tubular member may be equalised quickly without gas or air having to break through the film of liquid by passage through the small perforations across which the liquid is caused to flow, it being understood that the dimensions of the small perforations are such, and preferentially the flow of liquid is so adjusted, that a continuous liquid film can be stretched and maintained across them.

If desired, the upper portion of the perforated tubular member may be fitted with a sleeve equipped with suitable drip trays for catching and respreading any liquid which on striking the tubular member and/or the wall of the treating vessel, may rebound instead of flowing down in film form.

It will be appreciated that, in some instances, both of the arrangements described may be utilised. For example, in instances in which it is desired to remove the air wholly or partly from a liquid and to subsequently replace the same with a gas such as carbon-dioxide, the liquid may be treated firstly in an apparatus such as that shown in Fig. 1 and then passed on for treatment in an apparatus such as that shown in Fig. 2 connected with a source of the gas under pressure.

I claim:

1. Apparatus for incorporating gas in liquid and for degasifying liquids containing gas comprising a closed treating vessel, a vertically disposed open-ended tubular member mounted within said vessel in spaced relation to the side walls thereof, means for supplying a liquid to be treated to the surface of said tubular member including an upwardly directed liquid flow conduit positioned with its discharge end in the upper portion of said tubular member, said tubular member having a series of perforations provided therein across which the liquid is caused to flow in the form of a thin film to effect continuous agitation of the liquid as it passes downwardly along the wall of said tubular member from the top to the bottom thereof, and a flat plate positioned above the upper portion of said tubular member to receive a stream of liquid from the upwardly directed conduit and cause said stream to spread and flow outwardly to the wall of the perforated tubular member.

2. Apparatus as claimed in claim 1 in which the flat plate is arranged so that it abuts against the upper end of the perforated tubular member.

3. Apparatus as claimed in claim 1 wherein the upper end of the perforated member is formed with a series of cutaway portions permitting some of the spreading liquid to pass on across the flat plate to the inner surface of the treating vessel so that use is made of this relatively large area for furnishing a third thin film of the liquid under treatment.

RONALD ARTHUR HILL.